United States Patent
Schoppmeier

(10) Patent No.: US 10,064,100 B2
(45) Date of Patent: Aug. 28, 2018

(54) DATA TRANSMISSION USING DIFFERENT TRANSMISSION TECHNOLOGIES

(71) Applicant: Lantiq Deutschland GmbH, Neubiberg (DE)

(72) Inventor: Dietmar Schoppmeier, Unteraching (DE)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

(21) Appl. No.: 13/891,853

(22) Filed: May 10, 2013

(65) Prior Publication Data

US 2014/0154973 A1 Jun. 5, 2014

(30) Foreign Application Priority Data

May 10, 2012 (EP) .................................. 12003736

(51) Int. Cl.
*H04B 7/24* (2006.01)
*H04W 28/08* (2009.01)
*H04L 29/06* (2006.01)
*H04W 88/06* (2009.01)

(52) U.S. Cl.
CPC ........... *H04W 28/085* (2013.01); *H04L 69/14* (2013.01); *H04W 88/06* (2013.01); *Y02D 50/30* (2018.01)

(58) Field of Classification Search
CPC ...... H04L 69/14; H04W 28/085; H04W 88/06
USPC .......................................... 455/39, 90.2, 557
See application file for complete search history.

(56) References Cited

U.S. PATENT DOCUMENTS

| | | | |
|---|---|---|---|
| 5,675,577 A * | 10/1997 | Komatsu | 370/237 |
| 6,625,198 B1 * | 9/2003 | Tiedemann, Jr. | H04W 28/18 375/130 |
| 6,793,037 B1 * | 9/2004 | Babuke et al. | 181/293 |
| 6,973,037 B1 * | 12/2005 | Kahveci | 370/236 |
| 7,664,875 B1 | 2/2010 | Clay et al. | |
| 7,747,279 B2 * | 6/2010 | Hoddie | 455/557 |
| 2002/0019228 A1 * | 2/2002 | McKenna | H04W 8/26 455/435.1 |
| 2002/0110097 A1 * | 8/2002 | Sugirtharaj | H04W 28/20 370/329 |
| 2004/0100562 A1 | 5/2004 | Ichikawa et al. | |
| 2005/0163093 A1 | 7/2005 | Garg et al. | |
| 2005/0168326 A1 * | 8/2005 | White, II | H04B 3/54 370/475 |
| 2005/0221858 A1 * | 10/2005 | Hoddie | H04W 28/16 455/557 |
| 2006/0013184 A1 * | 1/2006 | Utsunomiya et al. | 370/343 |
| 2008/0029707 A1 * | 2/2008 | Kari | A61B 6/4405 250/370.09 |
| 2009/0034498 A1 * | 2/2009 | Banerjea | H04W 76/025 370/338 |
| 2010/0202358 A1 * | 8/2010 | Wu | H04L 12/5692 370/328 |
| 2011/0110229 A1 | 5/2011 | Himayat et al. | |

(Continued)

FOREIGN PATENT DOCUMENTS

DE 102004049705 A1 4/2006

*Primary Examiner* — Raj Chakraborty
(74) *Attorney, Agent, or Firm* — Eschweiler & Potashnik, LLC

(57) ABSTRACT

Methods and coordination units are provided which partition data transmission between a first network entity and a second network entity between at least two communication channels which employ different technologies.

12 Claims, 3 Drawing Sheets

(56) References Cited

U.S. PATENT DOCUMENTS

| | | | |
|---|---|---|---|
| 2011/0235651 A1 | 9/2011 | Martinez et al. | |
| 2011/0286393 A1* | 11/2011 | Fouren | H04L 12/2807 370/328 |
| 2012/0108185 A1* | 5/2012 | Yen | H04B 1/0064 455/90.2 |

* cited by examiner

DATA TRANSMISSION USING DIFFERENT TRANSMISSION TECHNOLOGIES

RELATED APPLICATIONS

This Application claims priority benefit of European Patent Application 12003736.1, filed on May 10, 2012. The entire contents of the European Patent Application are incorporated herein by reference.

BACKGROUND

The present application relates to data transmission using different transmission technologies, for example a mix of wireless and wire-based transmission technologies, in networks, for example home networks or enterprise networks.

Various technologies are used for data transmission in local networks like home networks or enterprise networks. For example, many Internet providers already provide communication devices having WLAN functionality for establishing a wireless network in a user's home. However, in many houses walls or ceilings, in particular walls or ceilings incorporating steel, constitute comparatively effective barriers for such wireless communication by attenuating the signals considerably. Therefore, the data rate achievable with such wireless connections is reduced, or the communication may even become impossible altogether. In this case other technologies, in particular wire-based technologies like Ethernet, Powerline (i.e. data transmission via a power network), telephone cable based networking or networking based on coaxial cables as for example defined in home network standards, may be employed.

However, installations for such additional networks require additional power. Moreover, for example even when wire-based network technologies like Powerline are used, WLAN equipment often is still present.

Therefore, a need exists for efficient use of various network technologies.

SUMMARY

According to an embodiment, a method as defined in claim 1 is provided. According to another embodiment, a coordination device as defined in claim 10 is provided.

According to an embodiment, a method is provided, comprising partitioning data transmission, said data transmission being between a first network entity and a second entity, between at least two communication channels, a first communication channel of the at least two communication channels using a first communication technology and a second communication channel of the at least two communication channels using a second communication technology different from said first communication technology.

In some embodiments, through partitioning the data transmission, the capacity of the at least two communication channels may be used effectively.

In some embodiments, the first communication technology may comprise a wireless communication technology, for example a WLAN technology, and the second communication technology may comprise a wire-based communication technology like Powerline, Ethernet or transmission based on a coaxial or telephone cables.

The partitioning in some embodiments may comprise using only one of the communication channels in case the bandwidth of the one of the communication channels is sufficient for the data transmission, in which case the other communication channel(s) in some embodiments may be switched off to save power. If a bandwidth demand exceeds the bandwidth of the one communication channel, two or more of the at least two communication channels may be used in parallel.

According to another aspect, a coordination device is provided, wherein said coordination device is configured to control and/or cause a partitioning of a data transmission between a first network entity and a second entity between at least two communication channels, a first communication channel of the at least two communication channels using a first communication technology and a second communication channel of the at least two communication channels using a second communication technology different from said first communication technology.

The coordination device may be configured to implement any one of the above-described methods.

In some embodiments, the coordination device may comprise a first interface to be coupled with the first network entity or the second network entity, a second interface to be coupled with a transceiver operating according to the first communication technology and a third interface to be coupled with a second transceiver operating according to the second communication technology.

In this case, in a network one such coordination device may be assigned to the first network entity, and another one of such a coordination device may be assigned to the second network entity.

Features of the above-described embodiments may be combined with each other unless specifically noted otherwise. Furthermore, it is to be noted that the above summary only is intended to give a brief overview over some embodiments and is not to be construed as limiting.

BRIEF DESCRIPTION OF THE DRAWINGS

Further embodiments will now be described with reference to the attached drawings, wherein.

DETAILED DESCRIPTION

In the following, specific embodiments of the present invention will be described in detail. It should be noted that features from various embodiments may be combined with each other unless specifically noted otherwise. On the other hand, describing an embodiment with a plurality of features is not to be construed as indicating that all those features are necessary for practicing the invention, as other embodiments may comprise less features and/or alternative features.

In the following description, any communication connection being described as wire-based may also be implemented by a wireless connection and vice versa. Also, describing an embodiment in terms of a plurality of functional blocks or entities is not to be construed as indicating that these entities necessarily have to be implemented as physically separate units unless indicated otherwise, as a plurality of functional entities may also be implemented in a single device or unit.

Figure 1:
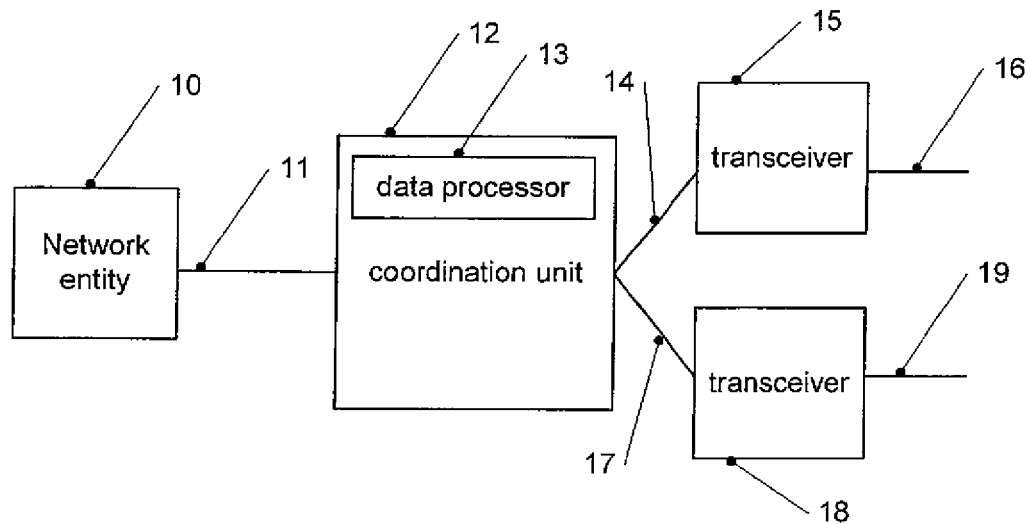
FIG. 1 is a block diagram illustrating a coordination unit according to an embodiment.

Turning now to the figures, in FIG. 1 a coordination device in form of a coordination unit 12 according to an embodiment and an example for an environment thereof is illustrated. In the embodiment of FIG. 1, coordination unit 12 is coupled via a first interface with a network entity 10, as symbolized by a connection 11. The first interface may be any kind of interface, for example a wire-based interface like an Ethernet interface or also a WLAN connection. In the context of the present application, a network entity like network entity 10 is any entity which transmits data via a network to one or more further network entities and/or receives data via the network from one or more further network entities.

Furthermore, coordination unit 12 is coupled with a first transceiver 15 via a second interface as symbolized by connection 14 and with a second transceiver 18 via a third interface as symbolized by connection 17. It should be noted that in some embodiments the first, second and third interfaces mentioned above need not be physically separate interfaces. For example, two or all of the couplings with network entity 10, transceiver 15 and transceiver 18 may be realized via WLAN, i.e. a single WLAN interface. Also, in some embodiments, some or all of network entity 10, coordination unit 12 and first and second transceivers 15, 18 may be implemented within a single device. In some embodiments, coordination unit 12 may be coupled with more than one network entity. Coordination unit 12 may be configured as MIMO-system (Multiple Input Multiple Output) receiving for example a plurality of data streams from network entity 10 or further network entities and partitioning these data streams between first transceiver 15 and second transceiver 18. In other embodiments, more than two transceivers may be coupled with coordination unit 12.

In the embodiment of FIG. 1, first transceiver 15 transmits and receives data using a first communication technology over a first communication channel 16. Second transceiver 18 transmits and receives data using a second communication technology different from the first communication technology via a second communication channel 19. For example, the first communication technology may be a wireless communication technology like a WLAN technology (for example according to IEEE 802.11 standard), and the second communication technology may be a wire-based technology, for example a Powerline-based technology (transmission via a power network), an Ethernet communication technology, a communication technology using telephone lines or a communication technology using coaxial cables, for example as specified in G.HN developed by ITU. In other embodiments, the first communication technology and the second communication technology may be two different wire-based transmission technologies or two different wireless transmission technologies.

As already mentioned, coordination unit 12 may partition data to be sent between network entity 10 and a further network entity between first communication channel 16 and second communication channel 19 in order to efficiently use the available bandwidth of first communication channel 16 and second communication channel 19. For example, when network entity 10 transmits data to a further network entity, coordination unit 12 may receive the data to be transmitted and analyze the data via a data processor 13. Depending on a bandwidth necessary for transmitting the data determined by data processor 13, the data to be transmitted is partitioned between first communication channel 16 and second communication channel 19, i.e. sent to transceiver 15 or transceiver 18. In other cases, a bandwidth demand may directly be received from network entity 10. When some of the data is sent via transceiver 15 and some of the data is sent via transceiver 18, sequence identification numbers (SIDs) or other markers may be attached to data sent, for example incorporated in headers of data frames used for transmission, to enable a receiver side to bring data received via first communication channel and second communication channel 19 into the correct order. In some cases, when the bandwidth of one of the communication channels, for example communication channel 16, is sufficient to transmit all the data, only one communication channel may be used, and entities associated with the other communication channel, for example transceiver 18, may be disabled to save power. The partitioning used may be signaled to a receiver using corresponding messages.

Conversely, when receiving data, coordination unit 12 may receive data from transceiver 15 and/or transceiver 18, which in turn transceivers 15 and 18 received via communication channels 16 and 19, respectively. In case data belonging together is sent via those communication channels as described above, coordination unit 12 combines the data received into a single data stream, for example by using sequence index numbers as described above, and forwards this data stream to network entity 10.

Figure 2:
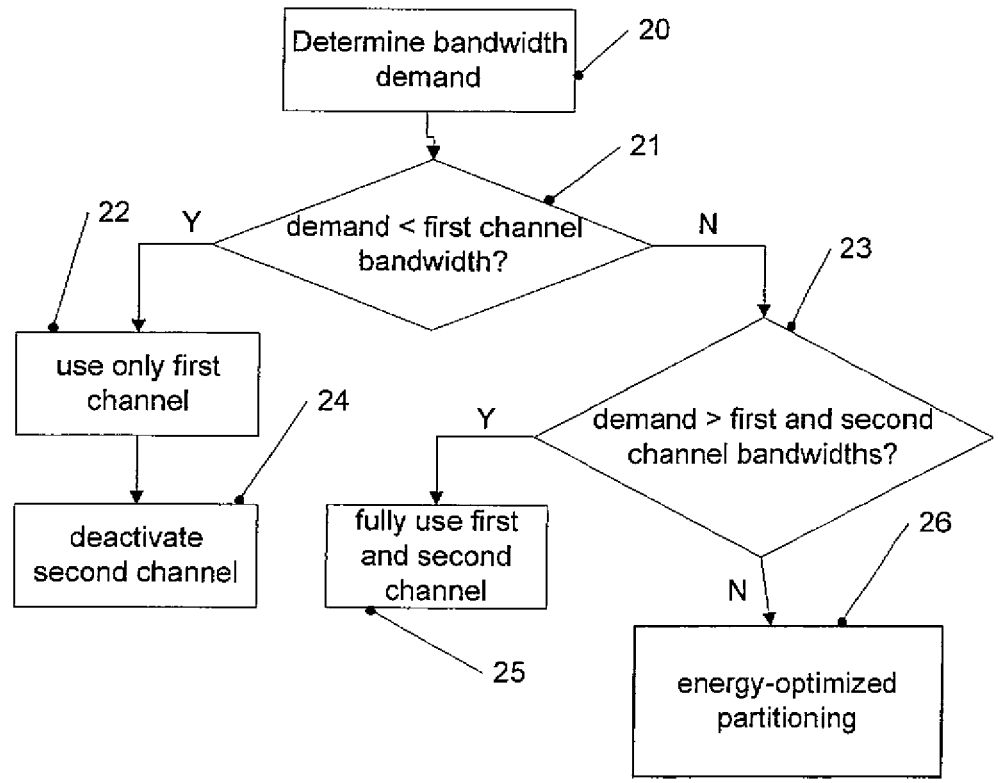
FIG. 2 is a flowchart illustrating a method according to an embodiment.

A more detailed example for a partitioning will next be described with reference to FIG. 2 showing a flowchart representing a method according to an embodiment. The method shown in FIG. 2 may for example be implemented in coordination unit 12 of FIG. 1, for example by programming data processor 13 accordingly, but may also be used independently from the embodiment of FIG. 1.

In the method of FIG. 2, it is assumed that data may be transmitted via a first communication channel and/or a second communication channel corresponding to different transmission technologies. For example, the first communication channel may be a WLAN communication channel, and the second communication channel may be a wire-based communication channel. In an example, the first communication channel may have less available bandwidth than the second communication channel, but may consume for example less power for transmission.

It should be noted that while the method of FIG. 2 is depicted as a series of acts or events, the described order of the events is not to be construed as limiting. For example, as will be explained below in further detail, at 21 and 23 comparisons are made to distinguish between different bandwidth requirements. Such comparisons may also be made in a different order as long as at the end a discrimination between the various cases is made.

At 20, a bandwidth demand for a connection between a first network entity and a second network entity is determined.

At 21, it is checked if the demand is smaller than the bandwidth of the first communication channel, for example a wireless communication channel.

If yes, at 22 only the first channel is used for communication, and at 24 the second channel is deactivated. For example the power for network devices associated with the second channel may be turned off in order to save power.

If at 21 the demand is greater than the first channel bandwidth, at 23 it is checked if the demand is greater than the first and second channel bandwidth combined.

If yes, at 25 both the first and second channel are used with their full bandwidth in order to transmit data. If no, at 26 an energy optimized partitioning is performed. For example, if the first channel consumes considerably less power than the second channel, the first channel may be used fully, and the second channel only as much as needed to transmit the data. In other cases, for example only the second channel may be used, and the first channel may be deactivated. In still other embodiments, an even distribution may be used.

Figure 3:
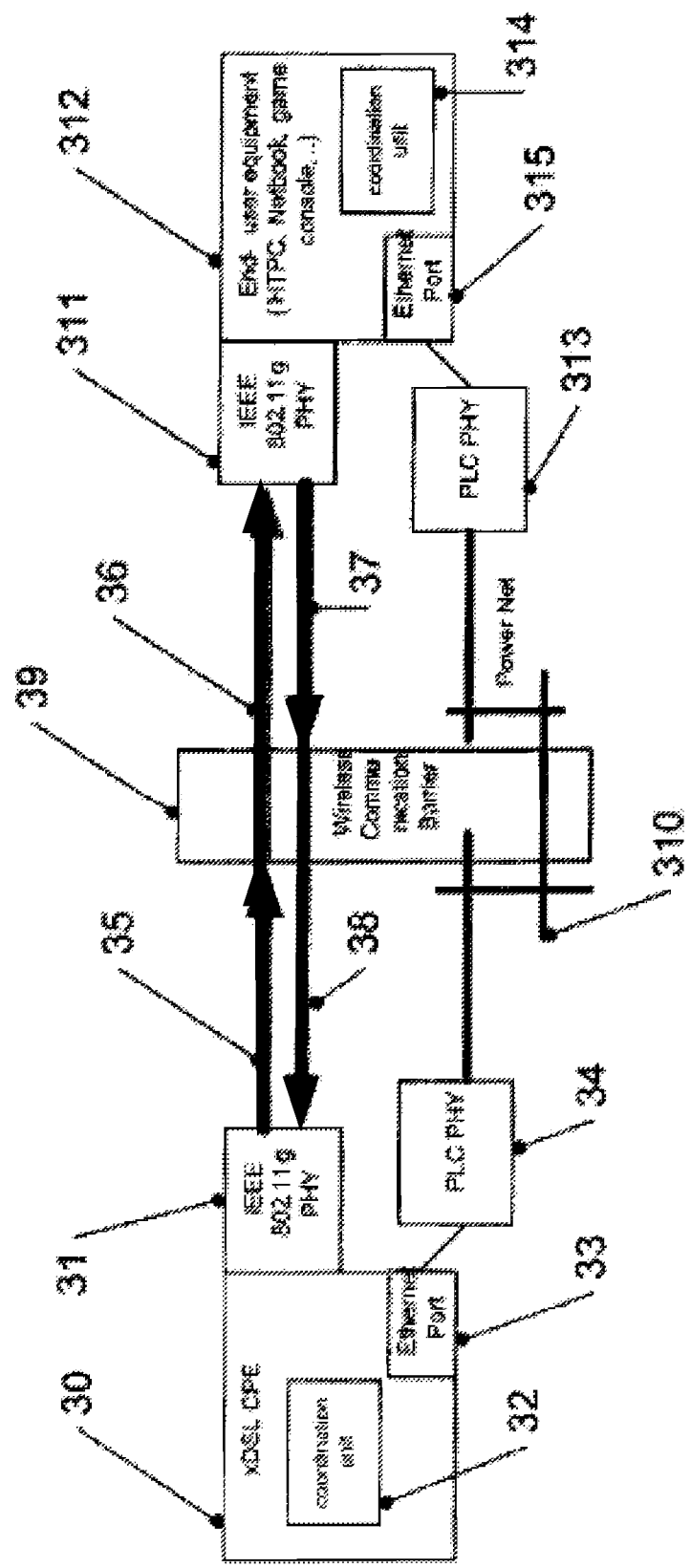
FIG. 3 is a first example of an environment implementing embodiments.

In FIG. 3, an example of an environment incorporating two communication units according to embodiments is shown. In the example of FIG. 3, communication is to be performed between a first network entity 30 being for example a xDSL customer premises equipment, for example a xDSL modem for coupling a home network with the Internet via xDSL, and a second network entity 312 being for example a user equipment like a personal computer, a game console and a netbook.

Network entity 30 has a WLAN interface 31, for example operating according to IEEE 802.11g, interface 31 representing the corresponding physical layer. Network entity 312 has a corresponding wireless interface 311 coupled thereto. As indicated by an arrow 35, wireless interface 31 transmits data towards wireless interface 311. However, a wireless communication barrier 39 is interposed between wireless interfaces 31 and 311. Therefore, the data transmission as indicated by an arrow 36 is attenuated. Likewise, in the reverse communication direction wireless interface 311 transmits data as indicated by an arrow 37, which is attenuated by wireless communication barrier 39 as indicated by an arrow 38.

Wireless communication barrier 39 may for example be a wall or a ceiling, in particular a wall or ceiling incorporating steel, a radiator located in the way between interfaces 31 and 311, a moving creature like a person between interfaces 31 and 311 or simply a long distance between interfaces 31 and 311.

Additionally, network entity 30 comprises an Ethernet port which is coupled with a Powerline connector physical layer 34 to be able to transmit and receive data via a power network 310, for example via home plug AV, home plug AV2 or Powerline-based G.HN. Likewise, network entity 312 comprises an Ethernet port 315 connected with a Powerline communication physical layer 313, such that network entities 30, 312 may also communicate via power network 310.

Network entity 30 comprises a coordination unit 32 according to an embodiment, and network entity 312 comprises a coordination unit 314 according to an embodiment. It should be noted that coordination units 32 and 314 need not be separate entities within network entities 30, 312, respectively, but may also be implemented by programming processors or other processing devices of network entities 30, 312 accordingly. Coordination units 32 and 314 partition data to be transmit via network entity 30 and network entity 312 for example as described above with reference to FIG. 1 and FIG. 2. In the case of an implementation as described with reference to FIG. 2, for example a first communication channel may be the wireless communication channel between wireless interfaces 31 and 311, and the second communication channel may be the communication channel via power network 310.

It should be noted that instead of or in addition to communication between power network 310, also other wire-based communications may be used, for example Ethernet communication, communication via coaxial cable, for example based on G.HN, or communication via telephone cables, for example based on G.HN.

Figure 4:
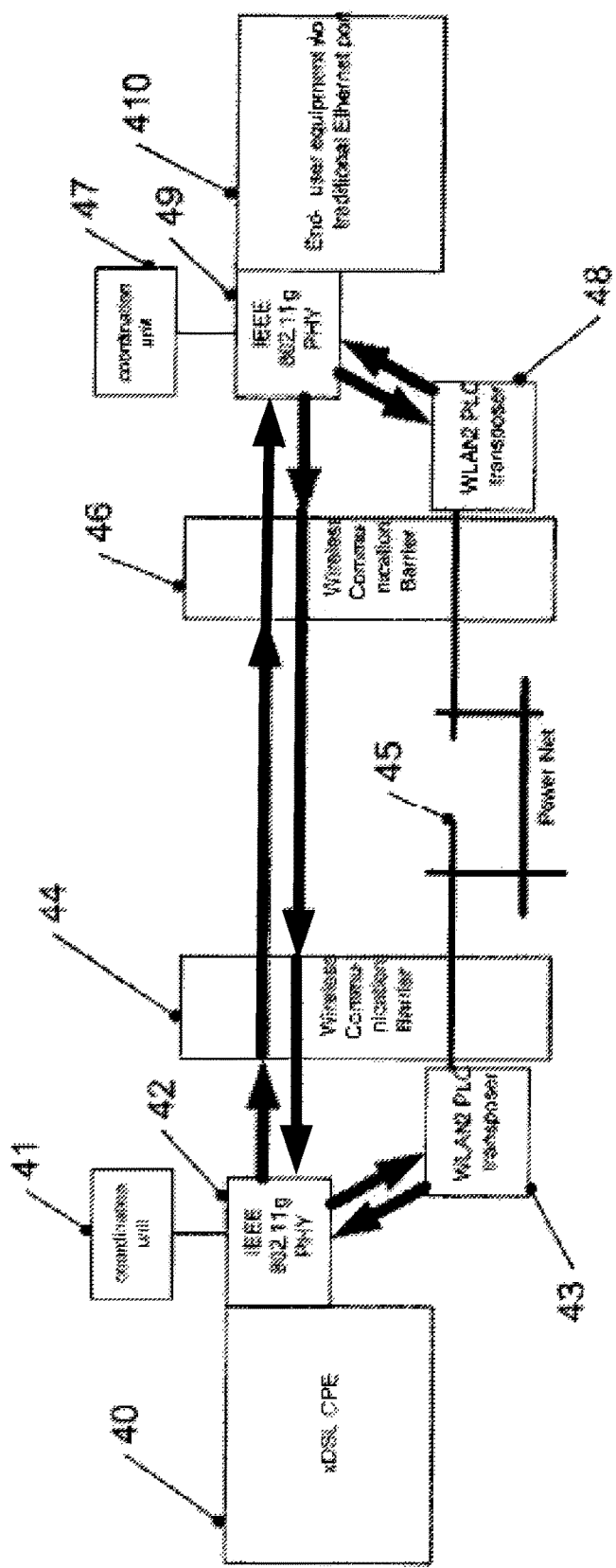
FIG. 4 is a second example of an environment implementing embodiments.

In FIG. 4, a different scenario is shown. Also here, communication takes place between a first network entity 40, which for example may again be a xDSL CPE, and a second network entity 410, which in the example of FIG. 4 is an end user equipment without Ethernet port, but only with a wireless interface 49, which again may be an IEEE 802.11g physical layer. Also network entity 40 is coupled to such a wireless interface 42.

Two wireless communication barriers 44, 46 attenuate wireless communication between wireless interfaces 42 and 49, such that only communication with low bandwidth (or, in some instances, possible even no communication, for example when additionally a person moves between the two interfaces) is possible. The direct wireless communication between interfaces 42, 49 in the example environment of FIG. 4 constitutes a first communication channel.

Furthermore, also in the environment of FIG. 4 communication via a power network 45 is possible. To this end, WLAN to Powerline communication transposers 43, 48 are provided. Transposer 43 receives wireless signals from interface 42 and converts them into Powerline signals and receives Powerline signals from power network 45 and transmits them as wireless signals to interface 42. Likewise, transposer 48 receives wireless signals from interface 49 and transposes them to Powerline signals, and receives Powerline signals from power network 45 and transposes them to wireless signals.

The communication via power network 45 constitutes a second communication channel. As already explained for FIG. 3, additionally or alternatively other wire-based communication channels may be used.

In the environment of FIG. 4, coordination units 41, 47 according to an embodiment are provided to partition transmission between network entities 40, 42 between the first communication channel and the second communication channel as explained above. In FIG. 4, coordination units 41, 47 are depicted as external coordination units controlling interfaces 42, 49 accordingly. In other embodiments, coordination units 41 and 47 may individually or both incorporated in network entities 40, 410, respectively, or interfaces 42, 49, respectively. In still other embodiments, coordination units 41, 47 may receive wireless signals from interfaces 42, 49 and either forward them as wireless signals through communication barriers 44, 46 or forward them to the respective transposer 43 or 48.

It should be noted that features of the environments and embodiments of FIGS. 3 and 4 may be exchanged or combined. For example, also in FIG. 3 two wireless communication barriers may be present, or in FIG. 4 only a single wireless communication barrier may be present. Also, for example network entity 30 and associated elements 32, 33, 34 and 31 may be replaced by network entity 40 and associated elements 41, 42, 43 of FIG. 4 in the embodiment of FIG. 3, or network 312 and associated elements 311, 313, 314, 315 may be replaced by network entity 410 and associated elements 47, 48, 49 in the embodiment of FIG. 3.

While with reference to FIG. 3 IEEE 802.11g has been used as an example for a wireless LAN standard, implementations according to other standards, for example IEEE 802.11a, are also possible.

While above embodiments usable in a home network or other type of local network like enterprise network have been shown, embodiments of the invention are also applicable to other kinds of networks.

Therefore, in particular in view of the possible modifications and alterations discussed above, the described embodiments are not to be construed as limiting the scope of the present application.

The invention claimed is:

1. A method comprising:
receiving first data to be transmitted as a first data transmission between a first network entity and a second network entity;
determining that a first bandwidth demand for the first data transmission exceeds a bandwidth of a wireless communication channel;
in response to determining that the first bandwidth demand exceeds the bandwidth of the wireless communication channel, partitioning the first data transmission into a first portion and a second portion based on the first bandwidth demand;
concurrently transmitting the first portion by way of a wire-based communication channel and transmitting the second portion by way of the wireless communication channel; and
receiving second data to be transmitted as a second data transmission between the first network entity and the second network entity;
determining that a second bandwidth demand for the second data transmission is smaller than the bandwidth of the wireless communication channel;
in response to determining that the second bandwidth demand is smaller than the bandwidth of the wireless communication channel, transmitting an entirety of the second data transmission by way of the wireless communication channel;
receiving third data to be transmitted as a third data transmission between the first network entity and the second network entity;
determining that a third bandwidth demand for the third data transmission is larger than the bandwidth of the wireless communication channel but less than the bandwidth of the wireless communication channel combined with a bandwidth of the wire-based communication channel;
determining that the energy consumption of the wireless communication channel is less than the energy consumption of the wire-based communication channel;
in response to determining that the third bandwidth demand is larger than the bandwidth of the wireless communication channel but less than the bandwidth of the wireless communication channel combined with the bandwidth of the wire-based communication channel and that the energy consumption of the wireless communication channel is less than the energy consumption of the wire-based communication channel, partitioning the third data transmission into a third portion that fully uses the bandwidth of the wireless communication channel and a fourth portion that corresponds to a remainder of the third data transmission; and
concurrently transmitting the third portion by way of the wireless communication channel and transmitting the fourth portion by way of the wire-based communication channel.

2. The method of claim 1, wherein the wire-based communication channel uses a communication technology selected from a group consisting of a power line technology, an Ethernet technology, a technology using telephone cables and a technology using coaxial cables.

3. The method of claim 1, further comprising deactivating components associated with the wire-based communication channel in response to transmitting the entirety of the second data transmission by way of the wireless communication channel.

4. The method of claim 1, further comprising fully using the bandwidth of the wireless communication channel and a bandwidth of the wire-based communication channel in response to determining that the first bandwidth demand is greater than the bandwidth of the wireless communication channel plus a bandwidth of the wire-based communication channel.

5. A communication coordination device, wherein said communication coordination device is configured to:
receive first data to be transmitted as a first data transmission between a first network entity and a second network entity;
determine that a first bandwidth demand for the first data transmission exceeds a bandwidth of a wireless communication channel;
in response to determining that the first bandwidth demand exceeds the bandwidth of the wireless communication channel, selectively cause a partitioning of the first data transmission into a first portion and a second portion based on the first bandwidth demand;
concurrently transmit the first portion by way of a wire-based communication channel and transmit the second portion by way of the wireless communication channel; and
receive second data to be transmitted as a second data transmission between the first network entity and the second network entity;
determine that a second bandwidth demand for the second data transmission is smaller than the bandwidth of the wireless communication channel; and
in response to determining that the second bandwidth demand is smaller than the bandwidth of the wireless communication channel, transmit an entirety of the second data transmission by way of the wireless communication channel;
receive third data to be transmitted as a third data transmission between the first network entity and the second network entity;
determine that a third bandwidth demand for the third data transmission is larger than the bandwidth of the wireless communication channel but less than the bandwidth of the wireless communication channel combined with a bandwidth of the wire-based communication channel;
determine that the energy consumption of the wireless communication channel is less than the energy consumption of the wire-based communication channel;
in response to determining that the third bandwidth demand is larger than the bandwidth of the wireless communication channel but less than the bandwidth of the wireless communication channel combined with the bandwidth of the wire-based communication channel and that the energy consumption of the wireless communication channel is less than the energy consumption of the wire-based communication channel, selectively cause a partitioning of the third data transmission into a third portion that fully uses the bandwidth of the wireless communication channel and a fourth portion that corresponds to a remainder of the third data transmission; and
concurrently transmit the third portion by way of the wireless communication channel and transmit the fourth portion by way of the wire-based communication channel.

6. The communication coordination device of claim 5, comprising at least one interface to couple the communication coordination device with a network entity with a first transceiver employing a wireless communication technology and with a second transceiver employing a wire-based communication technology.

7. The communication coordination device of claim 5, further configured to deactivate components associated with the wire-based communication channel in response to determining that the first bandwidth demand is smaller than the bandwidth of the wireless communication channel.

8. The communication coordination device of claim 5, further configured to fully use the bandwidth of the wireless communication channel and a bandwidth of the wire-based communication channel in response to determining that the first bandwidth demand is greater than the bandwidth of the wireless communication channel plus the bandwidth of the wire-based communication channel.

9. A network, comprising:
a first network entity,
a second network entity;
a first communication coordination unit associated with the first network entity, wherein said communication coordination device is configured to:
receive first data to be transmitted as a first data transmission between the first network entity and the second network entity;
determine that a first bandwidth demand for the first data transmission exceeds a bandwidth of a wireless communication channel;
in response to determining that the first bandwidth demand exceeds the bandwidth of the wireless communication channel, cause a partitioning of the first data transmission into a first portion and a second portion based on the first bandwidth demand;
concurrently transmit the first portion by way of a wire-based communication channel and transmit the second portion by way of the wireless communication channel; and
receive second data to be transmitted as a second data transmission between the first network entity and the second network entity;
determine that a second bandwidth demand for the second data transmission is smaller than the bandwidth of the wireless communication channel;
in response to determining that the second bandwidth demand is smaller than the bandwidth of the wireless communication channel, transmit an entirety of the second data transmission by way of the wireless communication channel;
receive third data to be transmitted as a third data transmission between the first network entity and the second network entity;
determine that a third bandwidth demand for the third data transmission is larger than the bandwidth of the wireless communication channel but less than the bandwidth of the wireless communication channel combined with a bandwidth of the wire-based communication channel;
determine that the energy consumption of the wireless communication channel is less than the energy consumption of the wire-based communication channel;
in response to determining that the third bandwidth demand is larger than the bandwidth of the wireless communication channel but less than the bandwidth of the wireless communication channel combined with the bandwidth of the wire-based communication channel and that the energy consumption of the wireless communication channel is less than the energy consumption of the wire-based communication channel, selectively cause a partitioning of the third data transmission into a third portion that fully uses the bandwidth of the wireless communication channel and a fourth portion that corresponds to a remainder of the third data transmission; and
concurrently transmit the third portion by way of the wireless communication channel and transmit the fourth portion by way of the wire-based communication channel.

10. The network of claim 9, wherein the first communication coordination unit comprises at least one interface to couple the communication coordination device with a network entity with a first transceiver employing a wireless communication technology and with a second transceiver employing a wire-based communication technology.

11. The network of claim 9, wherein the first communication coordination unit is further configured to deactivate components associated with the wire-based communication channel in response to determining that the first bandwidth demand is smaller than the bandwidth of the wireless communication channel.

12. The network of claim 9, wherein the first communication coordination unit is further configured to fully use the bandwidth of the wireless communication channel and a bandwidth of the wire-based communication channel in response to determining that the first bandwidth demand is greater than the bandwidth of the wireless communication channel plus the bandwidth of the wire-based communication channel.

* * * * *